US008938245B2

(12) United States Patent
Zhang et al.

(10) Patent No.: US 8,938,245 B2
(45) Date of Patent: Jan. 20, 2015

(54) WIRELESS TRANSMITTER IDENTITY OR POSITIONING INFORMATION PARTITIONING

(75) Inventors: Gengsheng Zhang, Cupertino, CA (US); Ju-Yong Do, Palo Alto, CA (US); Mark L. Moeglein, Ashland, OR (US)

(73) Assignee: QUALCOMM Incorporated, San Diego, CA (US)

( * ) Notice: Subject to any disclaimer, the term of this patent is extended or adjusted under 35 U.S.C. 154(b) by 33 days.

(21) Appl. No.: 13/562,245

(22) Filed: Jul. 30, 2012

(65) Prior Publication Data

US 2014/0031058 A1 Jan. 30, 2014

(51) Int. Cl.
*H04W 40/00* (2009.01)
(52) U.S. Cl.
USPC ............... 455/446; 455/456.5; 455/456.1; 701/117; 705/26.3
(58) Field of Classification Search
CPC ... H04W 16/18; H04W 64/00; G08G 1/0104; G06Q 30/08
USPC ............... 455/446, 456.5, 456.1; 701/117; 705/26.3
See application file for complete search history.

(56) References Cited

U.S. PATENT DOCUMENTS

| | | | |
|---|---|---|---|
| 5,731,786 | A | 3/1998 | Abraham et al. |
| 6,895,249 | B2 | 5/2005 | Gaal |
| 7,495,608 | B1 | 2/2009 | Chen et al. |
| 2003/0210656 | A1 | 11/2003 | Biacs et al. |
| 2004/0044468 | A1* | 3/2004 | Adachi .................. 701/208 |
| 2004/0102893 | A1* | 5/2004 | Atkinson et al. ............... 701/117 |
| 2004/0127224 | A1* | 7/2004 | Furukawa et al. ............. 455/446 |
| 2008/0176583 | A1* | 7/2008 | Brachet et al. ............. 455/456.3 |
| 2009/0213821 | A1 | 8/2009 | Fonseca, Jr. et al. |
| 2011/0059756 | A1 | 3/2011 | Moeglein et al. |
| 2012/0036034 | A1* | 2/2012 | Golden et al. ............... 705/26.3 |
| 2013/0029686 | A1* | 1/2013 | Moshfeghi ................. 455/456.1 |

FOREIGN PATENT DOCUMENTS

| | | |
|---|---|---|
| EP | 1513360 A2 | 3/2005 |
| EP | 2034661 A1 | 3/2009 |

OTHER PUBLICATIONS

International Search Report and Written Opinion—PCT/US2013/052778—ISA/EPO—Nov. 4, 2013.

\* cited by examiner

*Primary Examiner* — Danh Le
(74) *Attorney, Agent, or Firm* — Berkeley Law & Technology Group, LLP

(57) ABSTRACT

Examples disclosed herein may relate to partitioning identity or position information for a plurality of wireless transmitters positioned within a geographical region into a plurality of sub-partitions.

52 Claims, 10 Drawing Sheets

WIRELESS TRANSMITTER IDENTITY OR POSITIONING INFORMATION PARTITIONING

BACKGROUND

1. Field

The subject matter disclosed herein relates to wireless transmitter identity or positioning information, and relates more particularly to partitioning identity or position information for a plurality of wireless transmitters positioned within a geographical region into a plurality of sub-partitions.

2. Information

The position of a mobile device, such as a cellular telephone, may be estimated based on information gathered from various systems. One such system may comprise a Global Navigation Satellite System (GNSS), which is one example of a satellite positioning system (SPS). SPS systems such as GNSS may comprise a number of space vehicles (SV) orbiting the earth. Another example of a system that may provide a basis for estimating the position of a mobile device is a cellular communication system comprising a number of terrestrial wireless transmitters/receivers, often referred to as "base stations," to support communications for a number of mobile devices. A further example of a system that may provide a basis for estimating the position of a mobile device is a wireless network compatible with one or more of the Institute of Electrical and Electronics Engineers (IEEE) 802.11 wireless local access network (WLAN) standards, which may also be referred to as a Wi-Fi network. Such a network may include wireless transmitters/receivers often referred to as "access points," for example.

A position estimate, which may also be referred to as a position "fix", for a mobile device may be obtained based at least in part on distances or ranges measured from the mobile device to one or more wireless transmitters, and also based at least in part on knowledge of the locations of the wireless transmitters. Such transmitters may comprise SVs in the case of an SPS, terrestrial base stations in the case of a cellular communications system, or Wi-Fi/802.11x access or points or other beacon transmitters, for example.

SUMMARY

In an aspect, a geographical region may be partitioned into a plurality of sub-regions. Respective sizes and/or shapes of the plurality of sub-regions may be based, at least in part, on respective amounts of wireless transmitters positioned within the plurality of sub-regions. Also, in an aspect, identity or position information for a plurality of wireless transmitters positioned within the geographical region may be partitioned into a plurality of sub-partitions comprising identity or position information for wireless transmitters positioned within the plurality of sub-regions.

In a further aspect, an article may comprise a storage medium having stored thereon instructions executable by a processor of a server computing platform to partition a geographical region into a plurality of sub-regions. Respective sizes and/or shapes of the plurality of sub-regions may be based, at least in part, on respective amounts of wireless transmitters positioned within the plurality of sub-regions. Also, in an aspect, the storage medium may have stored thereon further instructions executable by the processor to partition identity or position information for a plurality of wireless transmitters positioned within the geographical region into a plurality of sub-partitions comprising identity or position information for wireless transmitters positioned within the plurality of sub-regions.

Additionally, in an aspect, an apparatus may comprise a processor to partition a geographical region into a plurality of sub-regions, wherein respective sizes and/or shapes of the plurality of sub-regions are based at least in part on respective amounts of wireless transmitters positioned within the plurality of sub-regions. In an additional aspect, the processor may partition identity or position information for a plurality of wireless transmitters positioned within the geographical region into a plurality of sub-partitions comprising identity or position information for wireless transmitters positioned within the plurality of sub-regions.

BRIEF DESCRIPTION OF THE FIGURES

Non-limiting and non-exhaustive examples will be described with reference to the following figures, wherein like reference numerals refer to like parts throughout the various figures.

DETAILED DESCRIPTION

Figure 1:
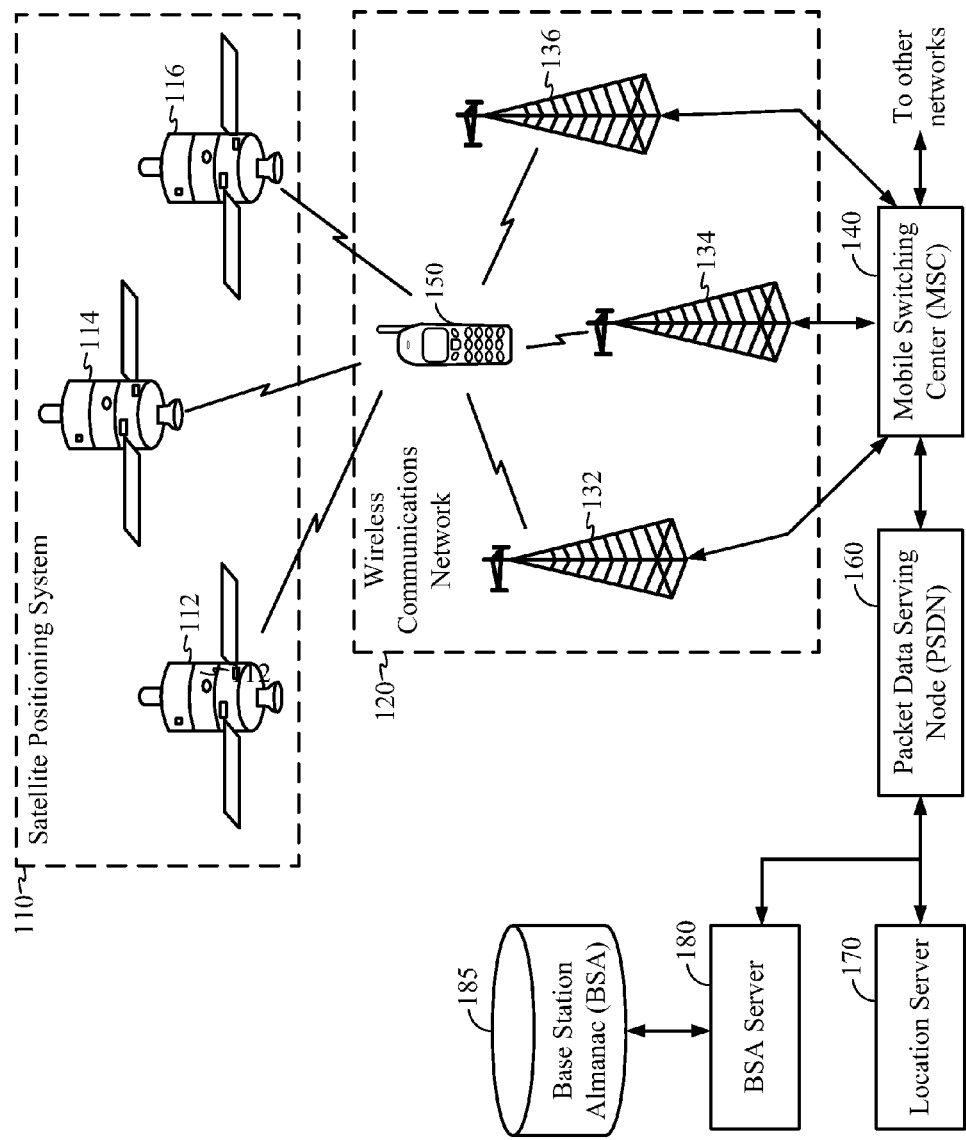
FIG. 1 is a schematic block diagram of an example satellite positioning system (SPS) and an example wireless communications network.

As discussed above, information in an almanac may be used to perform, at least in part, position estimation operations for mobile devices. A position estimate for a mobile device may be obtained based at least in part on distances or ranges measured from the mobile device to one or more transmitters such as space vehicles (SV), terrestrial base stations, or access points, for example, and also based at least in part on the locations of the one or more transmitters. A range to a transmitter may be measured based on one or more characteristics of one or more signals transmitted by the transmitter and received at the mobile device. Location and coverage area information of the transmitters may be ascertained, in at least some cases, based on the identities of the transmitters, and identities of the transmitters may be ascertained from signals received from the transmitters.

An almanac may be maintained for systems used for position estimation. The almanac may contain various types of information, including, for example, information that may be used in position estimation operations. Such information may include the identities and/or position information of various wireless transmitters of one or more wireless communications systems, for example. Information may also include coverage area information for various wireless transmitters or uncertainties for one or more parameters related to various wireless transmitters, in an aspect.

For some wireless communications systems, an almanac that stores information related to land-based transmitters may be referred to as a "base station almanac" (BSA). The terms "almanac" and "base station almanac" as used herein may be used interchangeably, and are meant to include any organized set of information related to a plurality of wireless transmitters of a wireless communications network. A BSA may be stored in a memory of a computing platform, such as a BSA server, for example, or in a memory of mobile device, for another example. In another aspect, a BSA may be transmitted from a BSA server to one or more mobile devices.

In one aspect, a mobile device may use received almanac information to perform position estimation operations, for example by trilateration or multilateration, using information or measurements from a number of transmitters. A mobile device may also use received almanac information, in another aspect, to narrow a code phase search window for acquiring signals transmitted by an SPS in order to perform position estimation operations using, at least in part, measurements from signals received from one or more space vehicles (SV). For example, to narrow a search window, a mobile device may use BSA information to associate an identification of a cellular communication system sector currently serving the mobile device with an almanac entry. The entry may provide a location of the transmitter for the serving sector, from which an approximate location (within a couple of kilometers, for example) of the mobile device may be obtained.

Mobile devices may have a limited capacity for storing information, due at least in part to size and cost considerations. Also, wireless communication channels may have limited throughput capacity. Therefore, it may be advantageous to provide a mobile device with wireless transmitter identity and/or position information more likely to be utilized in performing position fix operations and to not provide the mobile device with information it is unlikely to utilize. In this manner, the amount of almanac information to be stored at the mobile device may be kept within limits imposed by storage capacity, and the amount of communication channel capacity utilized in transmitting almanac information may be reduced. Furthermore, any reduction in the amount of data sent or received by mobile device may reduce mobile device power consumption and may therefore increase battery life.

To more efficiently provide wireless transmitter identity and/or position information to a mobile device, almanac information may be partitioned. In an aspect, an adaptive partitioning algorithm may be utilized. For example, an adaptive partitioning algorithm may comprise partitioning a geographical region into a plurality of sub-regions, wherein the respective sizes and/or shapes of the sub-regions may be based, at least in part, on respective amounts of wireless transmitters positioned within the plurality of sub-regions. Additionally, in an aspect, an adaptive partitioning algorithm may comprise partitioning identity and/or position information for a plurality of wireless transmitters positioned within a geographical region into a plurality of sub-partitions comprising identity and/or position information for wireless transmitters positioned within the plurality of sub-regions. For example, if a geographical region has located therein an amount of wireless transmitters that exceeds a specified threshold, the geographical region may be partitioned into two or more smaller sub-partitions. Additionally, wireless transmitter identity and/or position information for the wireless transmitters in the geographical region may be partitioned into two or more sub-partitions in accordance with the geographical sub-partitions. In an aspect, a threshold for an amount of wireless transmitters located in a geographical region may be specified based, at least in part, on a specified target file size. In other words, wireless transmitter identity and/or position information may be partitioned such that individual partitions may comprise file sizes that are within a target file size.

As mentioned above, almanac information may include information that may be used in position estimation operations, such as identities and/or position information of various wireless transmitters of one or more wireless communications systems, for example. However, almanac information may include more than just transmitter locations and attributes. For example, almanac information may include supporting map information and/or building-specific information to support indoor and/or outdoor navigation. Information to support indoor and/or outdoor navigation may include street map information, locations of entrances and/or exits, locations of windows, locations of walls, material types, radio frequency (RF) characteristics, etc. Almanac information may also include "heat maps" including information describing expected signal strength at various locations around one or more transmitters. Almanac partitioning may take on an increased importance when the size of such map information is taken into account.

Therefore, although various examples described herein may relate to partitioning position and/or identity information of various wireless transmitters of one or more wireless communications systems, the scope of claimed subject matter is not limited in this respect. For example, other types of almanac information, such as supporting map information, building-specific information, and/or heat map information may also be partitioned.

In an aspect, a determination of which wireless transmitter identity and/or position information partitions to transmit to a mobile device may be based, at least in part, on an expected route of the mobile device. An expected route of a mobile device may be determined based, at least in part, on inferences generated by a navigation application executed by a processor of the mobile device, for example. In a further aspect, one or more signals indicative of a request for wireless transmitter identity and/or position information may be transmitted from a communication interface of a mobile device to a network entity. An amount of wireless transmitter identity and/or position information to be delivered to a mobile device may further be limited by a specified maximum amount, in an aspect, although the scope of claimed subject matter is not limited in this respect.

FIG. 1 is a schematic block diagram of an SPS 110 and a wireless communications network 120 in communication with a mobile device 150. Wireless communications network 120, for this example, may comprise a cellular communications network capable of enabling voice communication for a number of mobile devices including mobile device 150, for example, and may further support position estimation for the mobile devices in addition to providing voice communication. Wireless communications network 120 may comprise any of a number of network types, several examples of which are described below. Wireless communications network 120 for this example comprises base stations 132, 134, and 136 that provide communication for a number of wireless terminals such as, for example, mobile device 150. For simplicity, only a few base stations 132, 134, and 136 are depicted and a single mobile device 150 is depicted in FIG. 1. Of course, other examples may include additional numbers of base stations, and the configuration of base stations depicted in FIG.

1 is merely an example configuration. Also, wireless communications network 120 is merely an example wireless communications system, and the scope of claimed subject matter is not limited in this respect.

As used herein, the terms "wireless transmitter" and "wireless access point" are interchangeable, and are meant to include any wireless communication station or device used to facilitate communication in a wireless communications system, such as, for example, a cellular network, although the scope of claimed subject matter is not limited in this respect. An example type of wireless transmitter or access point utilized in a cellular network may be referred to as a base station. In another aspect, a wireless transmitter or access point may comprise a femtocell, utilized to extend cellular telephone service into a business or home. In such an implementation, one or more mobile devices may communicate with a femtocell via a code division multiple access (CDMA) cellular communication protocol, for example, and the femtocell may provide the mobile device access to a larger cellular telecommunication network by way of another broadband network such as the Internet. In another aspect, wireless transmitters may be included in any of a range of electronic device types. In an aspect, a wireless transmitter may comprise a wireless local area network (WLAN) access point, for example. Such a WLAN may comprise a network that is compatible with one or more of the IEEE 802.11x standards, in an aspect, although the scope of claimed subject matter is not limited in this respect. Additionally, the use of the term "transmitter" in describing a device does not limit that device's function to transmitting only. For example, base stations and access points are typically capable of both transmitting and receiving wireless signals. Also, as used herein, the term "wireless access point" may refer to WLAN access points compatible with one or more of the IEEE 802.11x standards, for example, and may also refer to cellular base stations, in an aspect.

As used herein, the term "mobile device" refers to a device that may from time to time have a position that changes. Such changes in position may comprise changes to direction, distance, orientation, etc., as a few examples. In particular examples, a mobile device may comprise a cellular telephone, wireless communication device, user equipment, laptop computer, other personal communication system (PCS) device, personal digital assistant (PDA), personal audio device (PAD), portable navigational device, or other portable communication devices. A mobile device may also comprise a processor or computing platform adapted to perform functions controlled by machine-readable instructions.

In an aspect, SPS 110 may comprise a number of SVs, for example SVs 112, 114, and 116. For an example, SPS 110 may comprise one or more satellite positioning systems, such as GPS, GLONASS and Galileo, although the scope of claimed subject matter is not limited in this respect. In one or more aspects, mobile device 150 may receive signals from SVs 112, 114, and 116, and may communicate with one or more of base stations 132, 134, and 136. For example, mobile device 150 may obtain one or more measurements from one or more signals received from one or more of the SVs or base stations. However, in some circumstances timing signals from an SPS may not be available. In such a circumstance, mobile device 150 may gather propagation delay information through communication with one or more of base stations 132, 134, or 136. Mobile device 150 may calculate a position for the mobile device based, at least in part, on timing calibration parameters received through communication with one or more of base stations 132, 134, or 136, and further based, at least in part, on known locations of the base stations. Mobile device 150 may also make use of an estimated non-line-of-sight propagation delay for signals received from a base station source, a satellite source, or both, to correct range measurements to such sources.

In another aspect, position determination calculations may be performed by a network entity such as, for example, location server 170 depicted in FIG. 1, rather than at mobile device 150. Such a calculation may be based, at least in part, on signals acquired by mobile device 150 from one or more of base stations 132, 134, or 136. In a further aspect, location server 170 may transmit the calculated position to mobile device 150.

A mobile switching center (MSC) 140 for this example may be coupled to base stations 132, 134, and 136, and may further couple to other systems and networks, such as a public switched telephone network (PSTN), a packet data serving node (PDSN) 160, and so on. MSC 140 for this example may provide coordination and control for the base stations coupled to it and may further control routing of messages to/from the mobile devices served by these base stations. For the example depicted in FIG. 1, PDSN 160 may couple MSC 140 to location server 170 and to a BSA server 180. Location server 170 may collect and format base station location information, provide assistance to mobile devices for position estimation, or perform computations to obtain position estimates for the mobile devices. BSA server 180 may manage a BSA 185, which for this example may store partitioned identity and/or position information for a plurality of wireless transmitters, such as wireless transmitters 132, 134, and/or 136, for example, for wireless communications network 120.

In an aspect, BSA server 180 may provide wireless transmitter identity and/or position information to mobile device 150. Wireless transmitter identity and/or position information partitions to be provided to mobile device 150 may comprise a subset of BSA 185 selected based, at least in part, upon an expected route for mobile device 150. Information related to an expected route for mobile device 150 may be transmitted by mobile device 150 to a network entity, such as location server 170 or BSA server 180, for example, to determine which wireless transmitter identity and/or position information partitions that the mobile device is likely to utilize for positioning operations as the mobile device travels along the expected route.

In another aspect, wireless transmitter identity and/or position information partitions to be provided to mobile device 150 may comprise a subset of BSA 185 selected based, at least in part, on one or more additional parameters specified by mobile device 150. Such parameters may include one or more networks, sub-networks, or communications or SPS protocols specified by mobile device 150, an amount of available storage space for mobile device 150, indications of particular categories or types of information for individual wireless access points specified by mobile device 150, or the granularity of the data, to name but a few examples. Of course, claimed subject matter is not limited in scope in this respect. Example algorithms for partitioning wireless transmitter identity and/or position information are discussed below.

Figure 2:
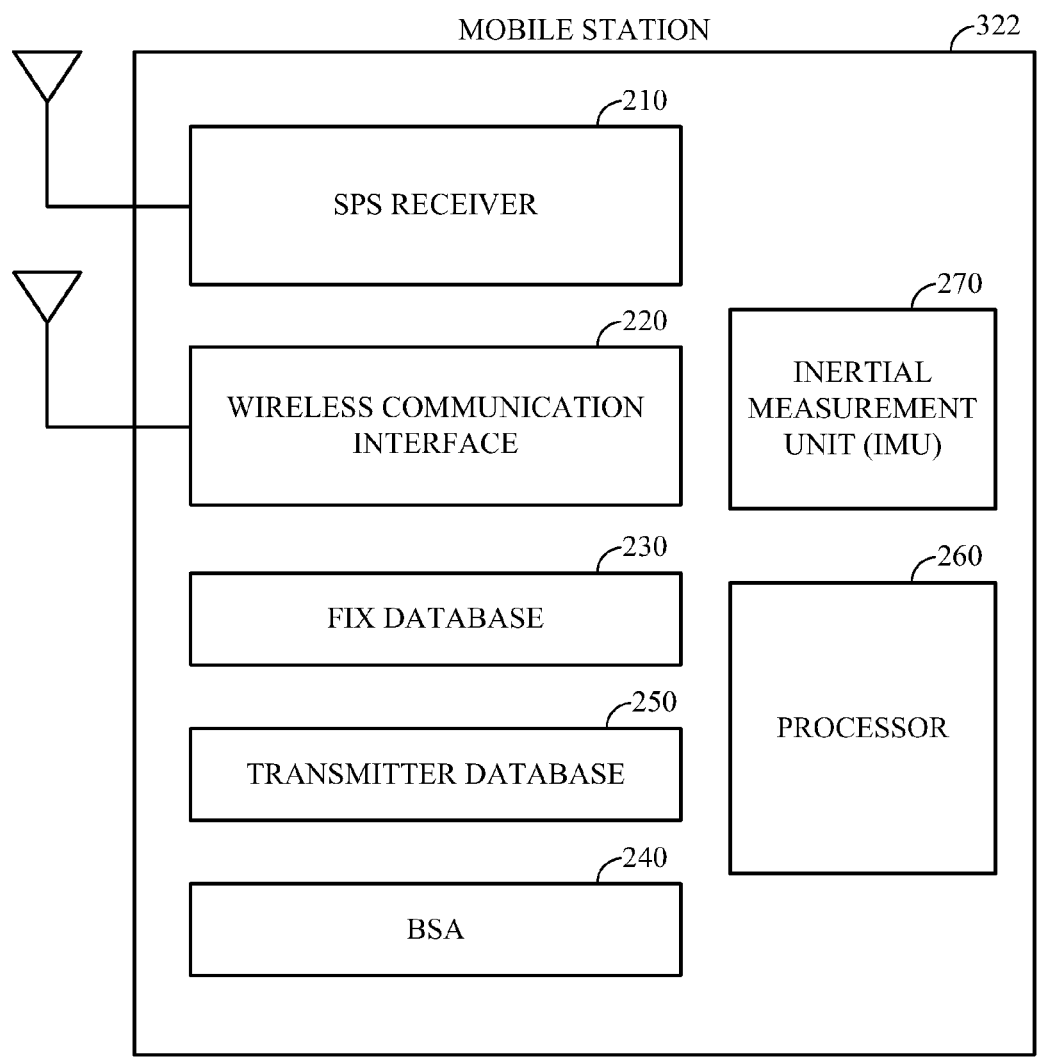
FIG. 2 is a schematic block diagram illustrating an example mobile device.

FIG. 2 is a schematic block diagram of an example implementation of a mobile device 322. In an aspect, mobile device 322 may comprise an SPS receiver 210 and a wireless communication interface 220. Thus, mobile device 322 may receive signals from one or more SPS such as SPS 110 and may receive from or transmit to one or more terrestrial wireless networks, such as wireless communications network 120, which may comprise a cellular network in an aspect, or may comprise a WLAN, in another aspect. In another aspect, mobile device 322 may further comprise a memory device to store position fix information in a fix database 230 and to store wireless transmitter identity and/or position information partitions in a base station almanac (BSA) 240.

In an aspect, a wireless transmitter database 250 may store information that may be organized or indexed according to particular wireless transmitters observed or identified during position fix operations. In a further aspect, mobile device 322 may comprise one or more sensors that for this example are incorporated into Inertial Measurement Unit (IMU) 270 that may be utilized in dead-reckoning navigation operations, for example. Mobile device 322 further comprises processor 260, for this example. Of course, this is merely one example of a configuration of a mobile device, and the scope of claimed subject matter is not limited in this respect.

Further, for an example, position information for wireless access points may comprise longitude and latitude components, and may for another example also comprise an altitude component. However, the scope of claimed subject matter is not limited in these respects. In another aspect, some wireless access points may broadcast their positions, and the positions of such wireless access points may be stored in one or more databases in a mobile device, such as in wireless transmitter database 250 of mobile device 322.

Figure 3:
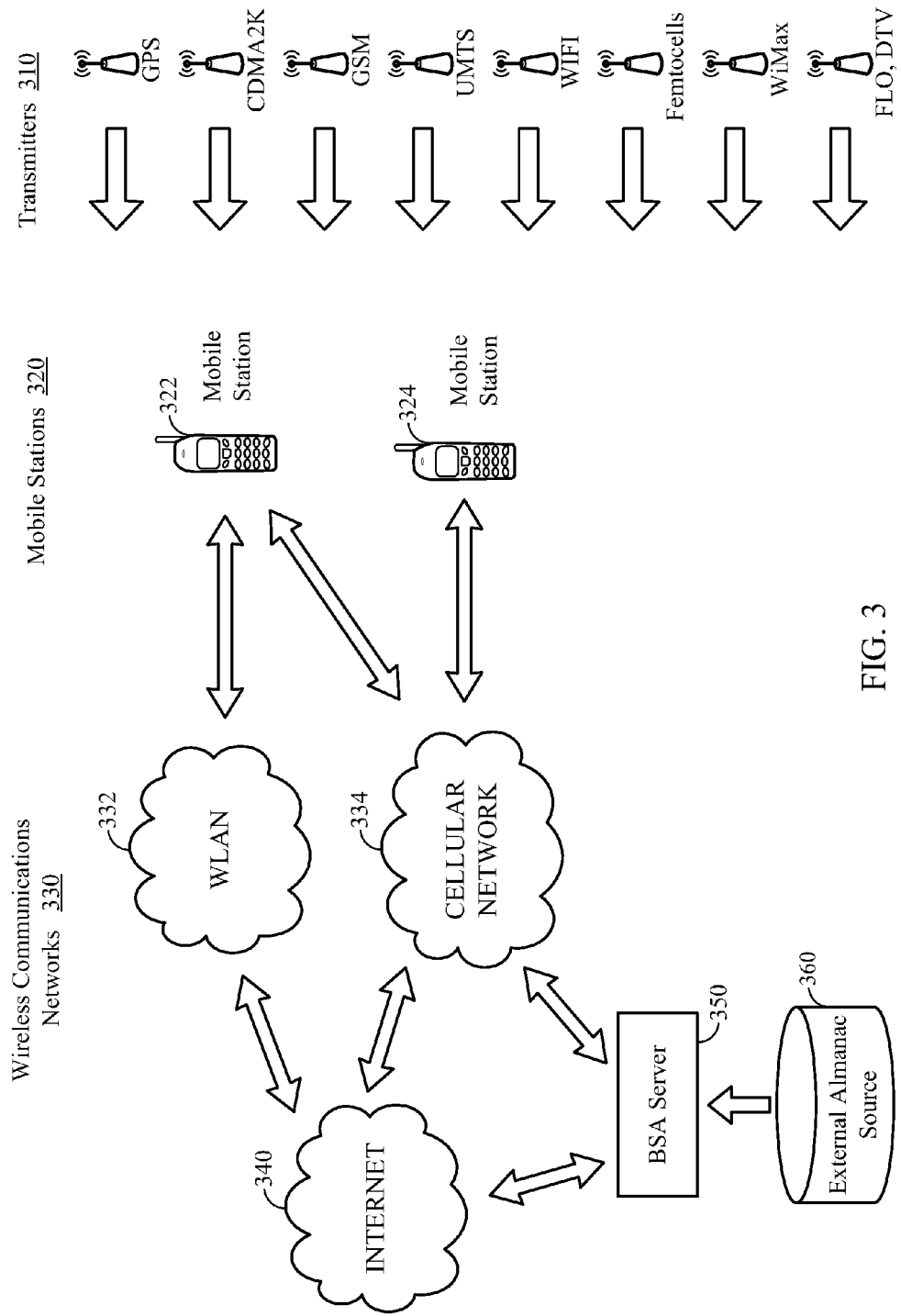
FIG. 3 is an illustration depicting an example almanac server in communication with a number of mobile devices via one or more wireless communications networks.

FIG. 3 is an illustration depicting an example base station almanac (BSA) server 350 in communication with a number of mobile devices 320 via one or more wireless communications networks 330, such as, for example, WLAN 332 and cellular network 334, and via Internet 340. For this example, mobile device 322 may represent a multimode device that may support communication with both packet-switched wireless local area network (WLAN) 332 and cellular network 334. Of course, these are merely examples of the types of wireless communications networks with which a multimode device may communicate, and the scope of claimed subject matter is not limited in this respect. Also for this example, mobile device 324 may represent a single mode device that may support communication with cellular network 334. Again, the cellular network is merely one example of a wireless communications network with which a mobile device may establish communication.

FIG. 3 further depicts a number of wireless transmitter types 310 that mobile devices 320 may monitor. Mobile devices 320 may or may not be subscribed to any given network associated with the various respective transmitter types to be able to monitor signals transmitted from the various transmitter types. Therefore, access point locations provided to the mobile devices by a network entity may or may not include locations associated with access points belonging to networks to which the mobile devices are not subscribed. Mobile devices may specify particular networks or particular transmitter types if making requests for almanac information. For the example of FIG. 3, one or more of mobile devices 320 may request wireless transmitter identity and/or position information comprising one or more partitions of a larger BSA from BSA server 350. In a further aspect, processor 260 of mobile device 322 may initiate receiving wireless transmitter almanac information from a network entity, such as from BSA server 350.

In another aspect, BSA server 350 may obtain a BSA from an external almanac source 360. For example, a cellular network provider may contract with a third party to develop or provide one or more records including positions or identities of one or more wireless access points to BSA server 350. At least a subset of the records provided to BSA server 350 may eventually be transmitted in one or more partitions to one or more of mobile devices 320, in an aspect.

Although the example of FIG. 3 depicts two mobile devices, in practice a wide variety of mobile device types exhibiting a wide range of different functionalities or storage capabilities may be utilized to communicate with a large variety of potential network types. Further, the mobile devices may exhibit a wide range of different usage patterns. Therefore, it may be advantageous for BSA server 350 to provide individualized subsets of BSA information that the individual mobile devices may require or request, and it may be further advantageous to provide such information partitioned in a flexible manner according to a specified file size, coverage area, position, geographical region, or transmitter type, to name but a few examples of parameters that may be specified. In one aspect, these parameters may be specified by the mobile devices.

In examples described herein, a mobile device such as mobile device 322 may be described as requesting almanac information from BSA server 350. In response to receiving the request from mobile device 322, BSA server 350 may access position or identity information for a subset of wireless access points and may transmit one or more messages containing the position or identity information to mobile device 322. However, there may be a number of variations to these examples, in that there may be various techniques to partition wireless transmitter identity and/or position information to be delivered to mobile device 322. In some cases, the technique used may depend at least in part on a particular type of air interface.

Figure 4:
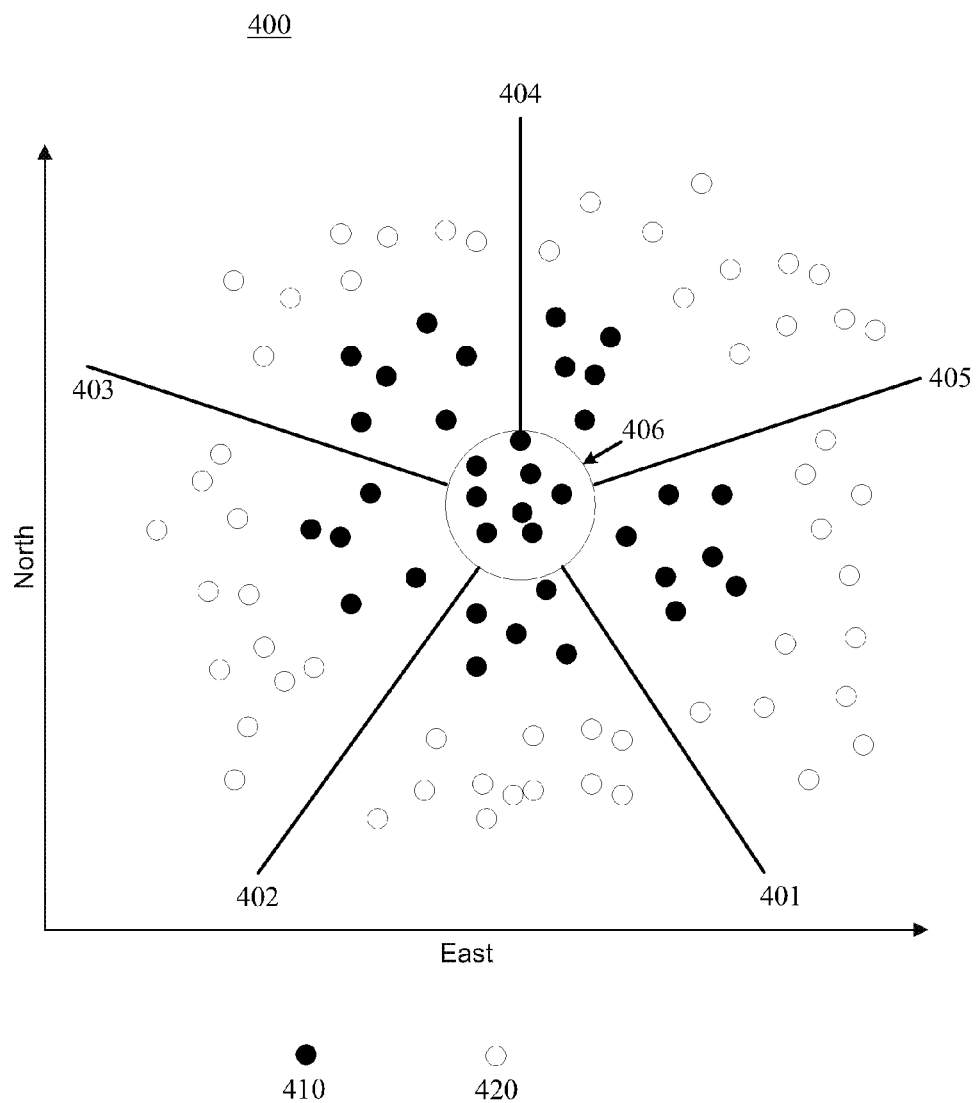
FIG. 4 is an illustration of a map depicting example locations for a number of wireless access points.

FIG. 4 is an illustration of a map depicting example locations for a number of wireless transmitters 410 and 420 positioned within a geographical region 400. FIG. 4 additionally illustrates geographical region 400 partitioned into a number of sub-regions. For example, region 400 may be partitioned into a central region defined by circle 406 and into a plurality of "pie-slices" defined by spokes 401, 402, 403, 404, and 405. In an aspect, an example sub-partition may be defined at least in part by circle 406, by spoke 404, and by spoke 405, for example. In an additional aspect, a sub-region defined by circle 406 may have positioned therein a number of wireless transmitters 410. Wireless transmitters 420 depict wireless transmitters that are not located within a sub-region. For example, it may be desirable to limit an amount of wireless transmitters within a region or sub-region. In an aspect, a size of the geographical region defined by circle 406 may be determined, at least in part, by a specified target amount of wireless transmitters. For example, if a determination is made that an amount of wireless transmitters positioned within circle 406 exceeds a threshold amount, a radius for circle 406 may be modified to provide for a reduced amount of wireless transmitters positioned within circle 406. Additionally, an amount of spokes and their positions may be determined based at least in part on an amount of wireless transmitters the positions of the various wireless transmitters. In an aspect, if a sub-region has positioned therein an amount of wireless transmitters that exceeds a specified threshold, that particular sub-region may itself be partitioned into smaller sub-regions.

In an aspect, the sub-regions partitioned from geographical region 400 may provide a basis for organizing wireless transmitter identity and/or position information that may be stored at an almanac server and that may, at least in part, be transmitted to mobile device 322 upon an appropriate request from mobile device 322. For example, a partition of wireless transmitter identity and/or position information associated with wireless transmitters positioned within geographical region 400 may be partitioned into a plurality of sub-partitions corresponding to wireless transmitters positioned within sub-regions defined by circle 406 and spokes 401-405. In an aspect, individual sub-partitions may represent 2 kBytes of wireless transmitter identity and/or position information, although claimed subject matter is not limited in scope in this respect.

Figure 5:
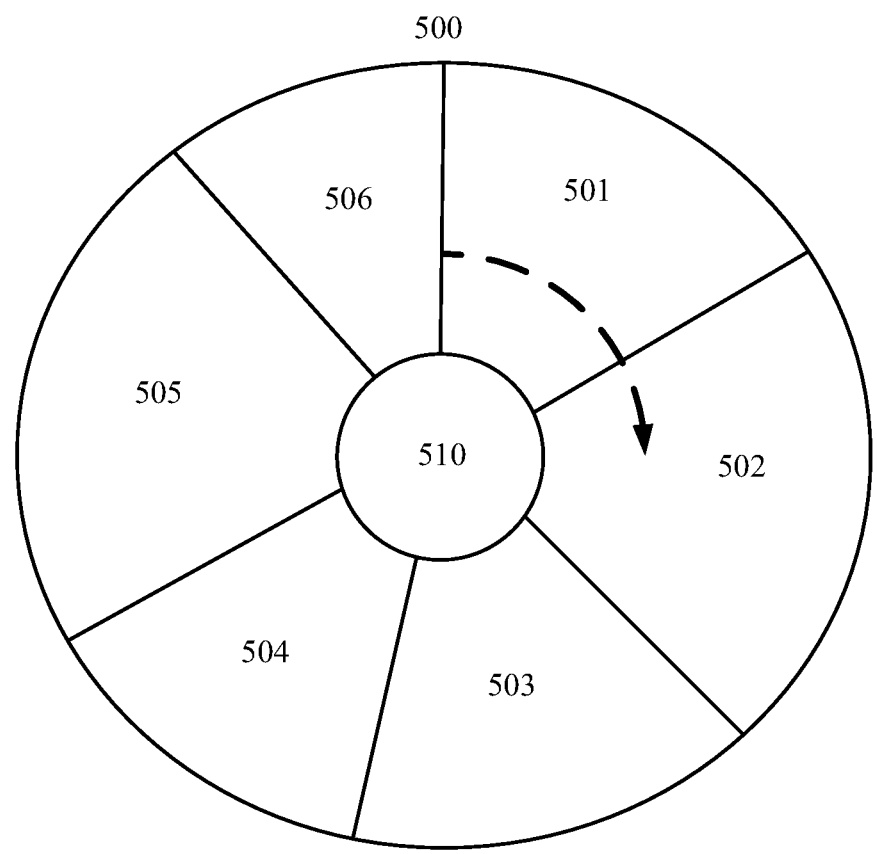
FIG. 5 is an illustration depicting an example geographical region partitioned into a plurality of sub-regions.

FIG. 5 is an illustration depicting an example geographical region 500 partitioned into a plurality of sub-regions 510, 501, 502, 503, 504, 505, and 506. FIG. 5 depicts an example "pie-slicing" algorithm, although claimed subject matter is not limited in this respect. In an aspect, if a determination is made that a wireless transmitter identity and/or position information partition is too large to include all wireless transmitters positioned within a corresponding geographical region, the wireless transmitter identity and/or position information partition may be partitioned into a plurality of smaller sub-partitions corresponding to respective sub-regions partitioned from a larger geographical region. Also, in an aspect, a determination of an amount of sub-partitions and/or a size for one or more of the sub-partitions may be based at least in part on a maximum file size specification, although claimed subject matter is not limited in this respect.

In an aspect, a geographical region having positioned therein an amount of wireless transmitters exceeding a specified threshold may be partitioned into a plurality of sub-regions. Wireless transmitter identity and/or position information may be partitioned into a respective plurality of sub-partitions, wherein individual sub-partitions are associated with individual sub-regions. Additionally, if a particular sub-region is determined to have positioned therein an amount of wireless transmitters exceeding a specified threshold, the particular sub-region may itself be partitioned into smaller sub-partitions, and an associated sub-partition of wireless transmitter identity and/or position information may be further partitioned into respective smaller partitions.

An example "pie-slice" algorithm for partitioning wireless transmitter identity and/or position information may comprise selecting center coordinates for a geographical region. In an aspect, center coordinates may be selected at least in part by determining mean values of latitude and longitude coordinates for wireless transmitters positioned within a geographical region, although claimed subject matter is not limited in this respect. Also, in an aspect, a geographical region may be partitioned into a circle region surrounding the center coordinates and also partitioned into a plurality of pie-slices at least in part in response to the geographical region having stored therein an amount of wireless transmitters exceeding a specified threshold value. For example, a threshold value for wireless transmitters positioned within a region may be selected to 100, although claimed subject matter is not limited in this respect.

In an aspect, circle 510 may have positioned therein an amount of wireless transmitters no greater than the selected threshold value, which for the present example comprises 100. Additionally, an amount of wireless transmitters positioned within any of sub-regions 501-506 may not exceed the selected threshold value. If a determination is made that a sub-region has positioned therein an amount of wireless transmitters exceeding the selected threshold value, that particular sub-region may be further partitioned in smaller sub-regions. In this manner, an amount of pie-slices may depend at least in part on a total amount of wireless transmitters within geographical region 500 and at least in part on a selected threshold value for wireless transmitters positioned in a sub-region.

For the example depicted in FIG. 5, circular sub-region 510 may be defined, at least in part, by center coordinates and by a radius. Additionally, individual pie-slices may be defined at least in part by a starting angle ("$\theta$") value and an ending $\theta$ value. For example, a start $\theta$ value for a first pie-slice, such as sub-region 501, may comprise a value of "0", and an ending $\theta$ value for a last pie-slice, such as sub-region 506, may comprise a value of "360". In an aspect, an amount pie-slices and their starting and ending $\theta$ values may depend at least in part on a total number of wireless transmitters in geographical region 500, for example, and at least in part on a specified threshold value for wireless transmitters positioned within individual pie-slices. As mentioned previously, geographic region 500 may be partitioned into additional pie-slices if needed to keep an amount of wireless transmitters positioned within individual pie-slices within the specified threshold value.

In a further aspect, center sub-region 500 and pie-slices 501-506 may not change upon an update of wireless transmitter identity and/or position information in order to avoid too frequent changes to the partitioning structure. An almanac server may store a region center coordinates, a circle radius, and pie-slice parameters and may apply the same to wireless transmitter identity and/or position information updates, in an aspect. However, in an additional aspect, at least in part in response to an amount of wireless transmitters in any sub-region being determined to be larger than a specified threshold value, a geographical region center may be recalculated, a radius of a circle sub-region may be recalculated, and pie-slice parameters may also be recalculated. Additionally, wireless transmitter identity and/or position information may be re-partitioned in accordance with the re-partitioning of the geographical region into the circle region and the plurality of pie-slices.

In an aspect, a pie-slicing technique for partitioning wireless transmitter identity and/or position information may be utilized for wireless networks having hierarchical terrestrial networks, such as, for example, wireless cellular networks. In another aspect, an example "cut-in-half" technique for partitioning wireless transmitter identity and/or position information, discussed below, may be utilized with non-hierarchical terrestrial networks, such as, for example, wi-fi networks. However, these are merely examples of network types and example techniques for partitioning wireless transmitter identity and/or position information, and claimed subject matter is not limited in scope in these respects.

Figure 6:
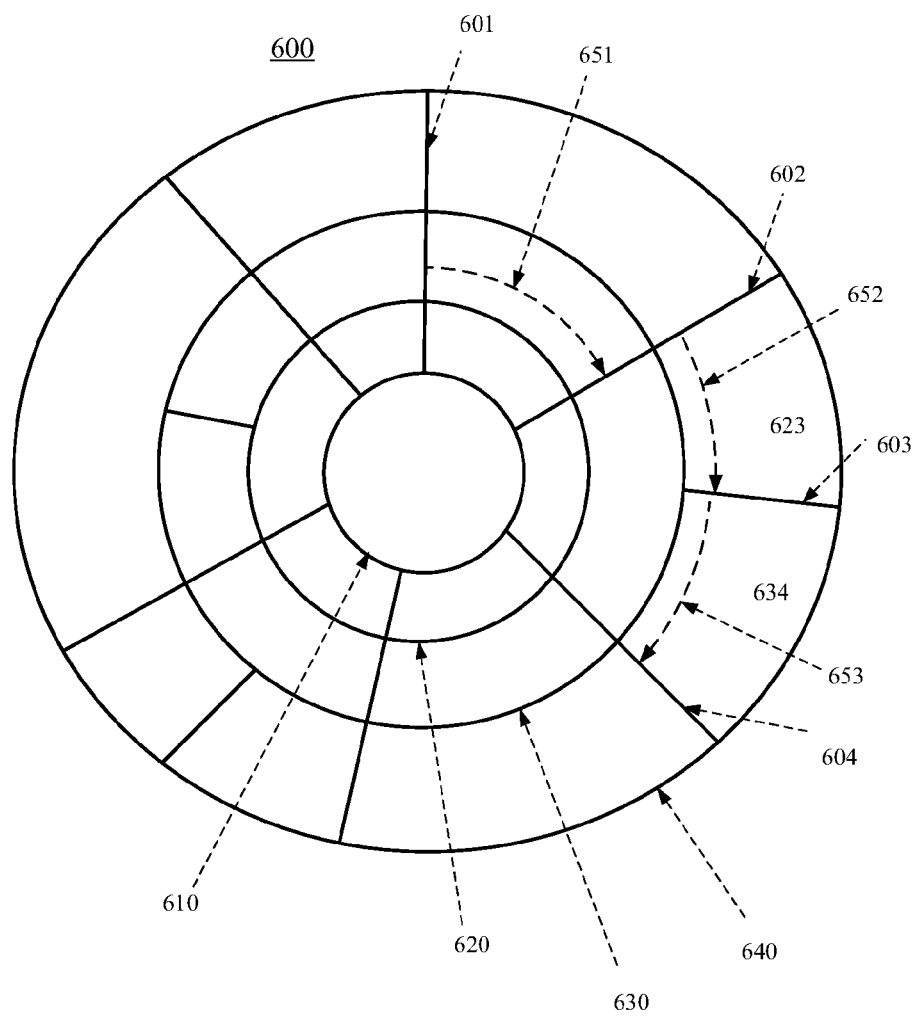
FIG. 6 is an illustration depicting an example geographical region partitioned into a plurality of sub-regions.

FIG. 6 is an illustration depicting an example geographical region 600 partitioned into a plurality of sub-regions. FIG. 5 depicts an example "pie-slicing" algorithm, although claimed subject matter is not limited in this respect. In an aspect, a geographical region 600 having positioned therein an amount of wireless transmitters exceeding a specified threshold may be partitioned into a plurality of sub-regions. Wireless transmitter identity and/or position information may be partitioned into a respective plurality of sub-partitions, wherein individual sub-partitions are associated with individual sub-regions. Additionally, if a particular sub-region is determined to have positioned therein an amount of wireless transmitters exceeding a specified threshold, the particular sub-region may itself be partitioned into smaller sub-partitions, and an associated sub-partition of wireless transmitter identity and/or position information may be further partitioned into respective smaller partitions. For example, if a sub-region defined by circle 610 and spokes 601 and 602 is determined to have positioned therein an amount of wireless transmitters exceeding a specified threshold amount, additional circles 620 and 630 may be defined to further partition geographical region 600 into smaller sub-regions.

In a further aspect, if additional partitioning is desired to reduce an amount of wireless transmitters within individual sub-regions, one or more additional spokes, such as spoke 603 may be utilized. For an example pie-slicing technique depicted in FIG. 6, example sub-partitions may be defined, at least in part, by one or more of circles 610, 620, 630, and/or 640, as well as at least in part by a starting θ value and an ending θ value. Example θ measurements are depicted in FIG. 6 by arrows 651, 652, and 653, for example. As depicted in FIG. 6, a sub-region 623 may be defined, at least in part, by a center coordinate for region 600, by a radius for circle 630, by a radius for circle 640, by a starting θ value indicated by spoke 602, and a final θ value indicated by spoke 603. As further depicted in FIG. 6, a sub-region 634 may be defined, at least in part, by the center coordinate for region 600, by the radius for circle 630, by the radius for circle 640, by a starting θ value indicated by spoke 603, and a final θ value indicated by spoke 604. Of course, these are merely examples of sub-regions partitioned from a geographical region, and claimed subject matter is not limited in these respects.

Figure 7:
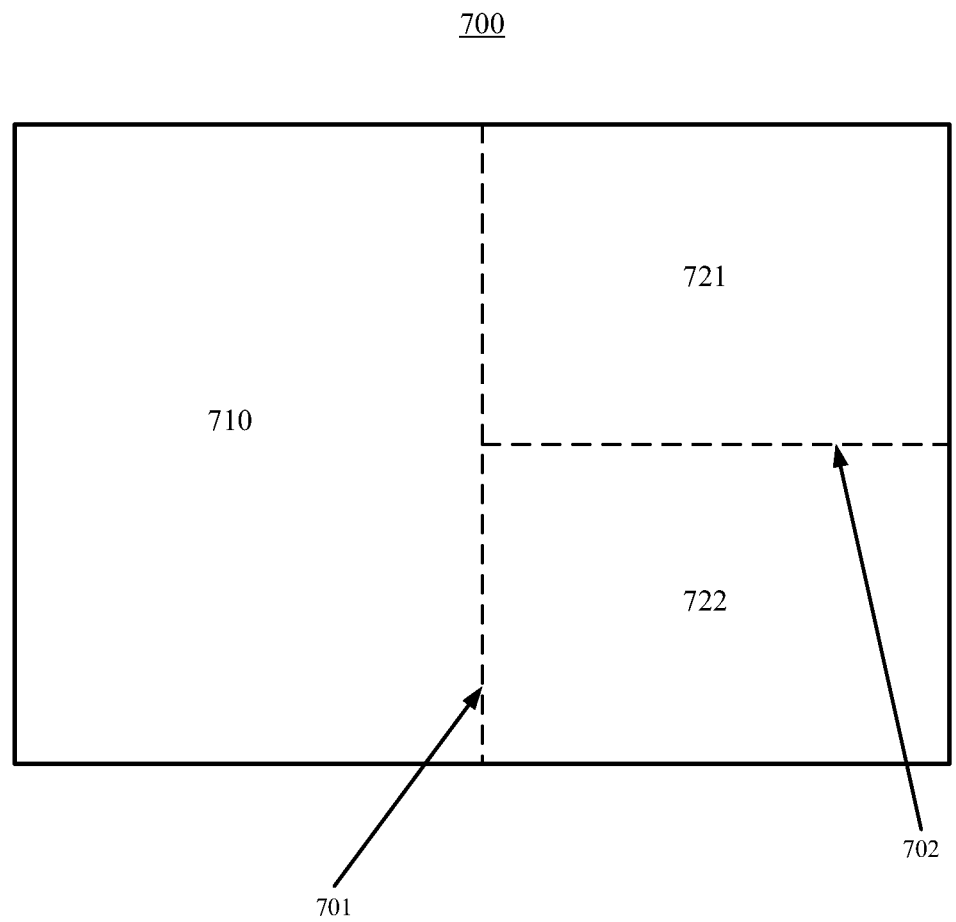
FIG. 7 is an illustration depicting an example geographical region partitioned into a plurality of sub-regions.

FIG. 7 is an illustration depicting an example geographical region 700 partitioned into a plurality of sub-regions 710, 721, and 722. FIG. 7 depicts an example partitioning technique that may be referred to as a "cut-in-half" technique, although claimed subject matter is not limited in this respect. In an aspect, in response to a wireless transmitter identity and/or position information partition being determined to be too large to include all wireless transmitters of a relatively large or a relatively dense geographical region, a server computing platform may partition geographic region 700 into a plurality of sub-regions so that individual wireless transmitter identity and/or position information partitions are within threshold values for amounts of wireless transmitters positioned within the individual sub-regions. For example, a server computing platform may partition geographic region 700 into a plurality of sub-regions. Additionally, a server computing platform may partition wireless transmitter identity and/or position information into a plurality of sub-partitions corresponding to related sub-regions.

In an aspect, a specified minimum coverage area for a region or sub-region and related partitions or sub-partitions, expressed as measurements of longitude and latitude, may comprise 0.01 degree by 0.01 degree (approximately 1 km by 1 km), for example. A specified threshold value for wireless transmitters positioned within individual sub-regions may comprise 100, for example.

In a further aspect, a partition of wireless transmitter may be further partitioned at least in part in response to a region or sub-region having positioned therein an amount of wireless transmitters greater than a specified threshold amount. A partition may be further partitioned, in an example, if the specified threshold for wireless transmitters is exceeded and if resulting sub-partitions are at least as large as a minimum partition coverage area. When there are more than maxNumCells, the partition is divided as long as it is larger than the minimum partition coverage area. Additionally, in an aspect, a specified value for a minimum amount of wireless transmitters for a region or sub-region may comprise a value of 5, although claimed subject matter is not limited in these respects.

In an aspect, an example cut-in-half technique for partitioning wireless transmitter identity and/or positioning information may comprise cutting in half a corresponding geographic region either horizontally (if the corresponding geographical region has a height greater than its width) or vertically (if the corresponding geographical region has a width greater than its height) at least in part in response to an amount of wireless transmitters in the geographical region exceeding a selected threshold value. In an aspect, an example cut-in-half technique may operate like a binary tree and thus individual sub-partitions may have different shaped corresponding sub-regions. For example, a first sub-partition may correspond to sub-region 710 that may cover approximately one half of region 700. Additionally, a second sub-partition may correspond to sub-region 721 that may cover approximately one quarter of region 700, and a third sub-partition may correspond to sub-region 722 that may cover approximately one quarter of region 700.

For an example cut-in-half technique, an initial coverage area may comprise a geographic region. A center, width, and height for the coverage area may be calculated, and a lower left corner and an upper right corner of the coverage area may also be calculated based, at least in part, on center latitude and longitude values for wireless transmitters positioned within the geographic region. A determination may be made as to whether a total number of wireless transmitters positioned within the geographic area is no greater than a specified threshold. A determination may also be made as to whether the coverage area is smaller or equal to a specified minimum coverage area size.

At least in part in response to the total number of wireless transmitters in the geographic are being determined to be less than the specified threshold, and at least in part in response to the coverage area being determined to be greater than the minimum coverage area size, the geographic region may be partitions into two sub-regions. For example, region 700 may be partitioned into two sub-regions, as indicated by line 701 in FIG. 7. For the example depicted in FIG. 7, at least in part in response to region 700 having a width greater than its height, region 700 may be partitioned vertically, as indicated by line 701. Additionally, centers, widths, heights, lower left corners, and upper right corners may be calculated for individual sub-regions, and further determinations may be made as to whether additional partitioning is desired based, at least in part, on amounts of wireless transmitters positioned within individual sub-regions. For the example of FIG. 7, geographic region 700 may be partitioned into sub-region 710 and into sub-regions 721 and 722. Of course, claimed subject matter is not limited to the specific example depicted in FIG. 7.

Figure 8:
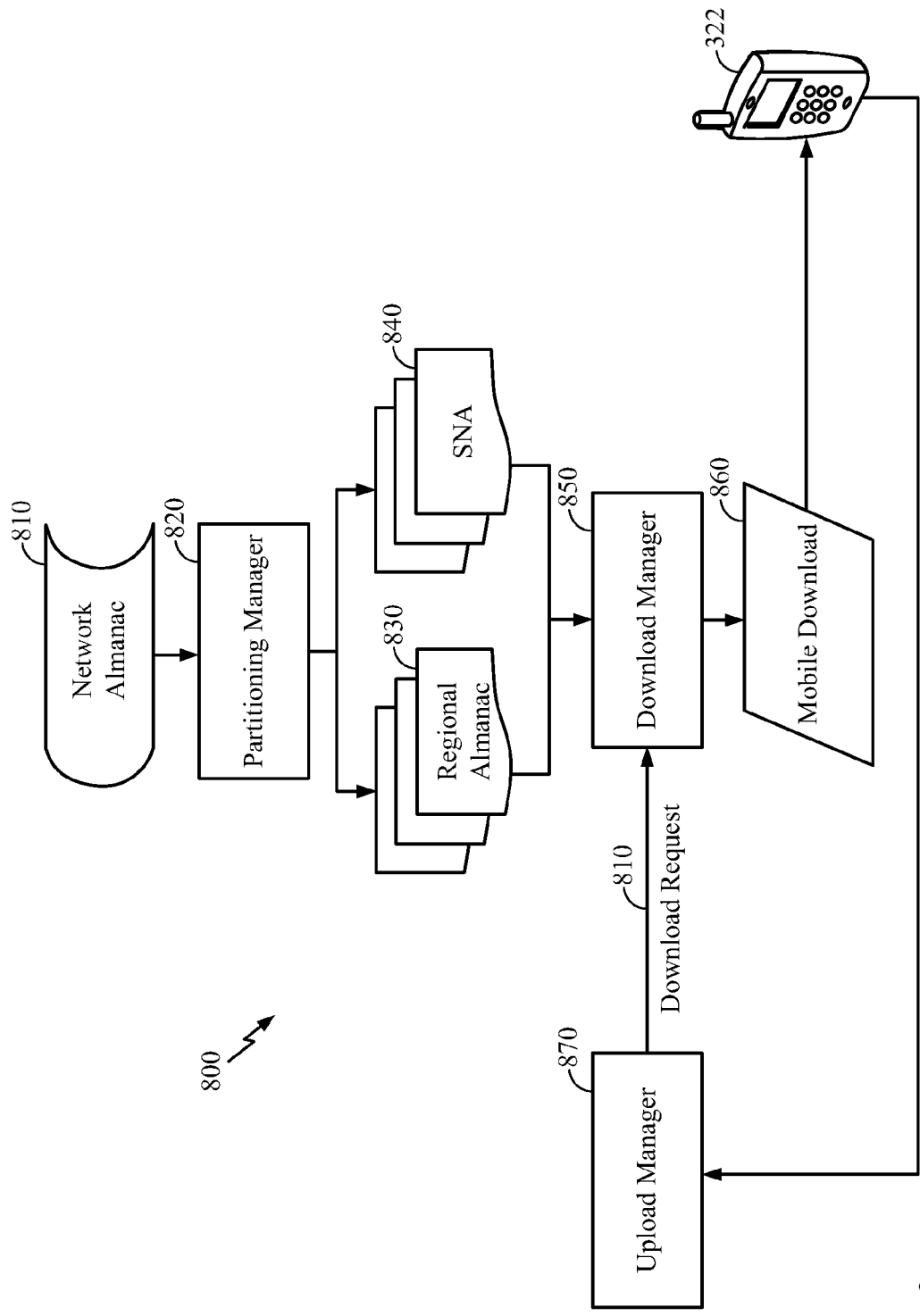
FIG. 8 is a schematic block diagram illustrating an example almanac server in one particular aspect.

FIG. 8 is a schematic block diagram illustrating an example process 800 for an example almanac server, in an aspect. In an additional aspect, FIG. 8 illustrates an example process for delivering a subset of a network almanac 810, including wireless transmitter identity and/or positioning information, to mobile device 322. Network almanac 810 may comprise identity and/or position information, in an example implementation, for a plurality of wireless transmitters. Network almanac 810 may store any of a wide range of information types for the plurality of wireless transmitters, including, for example, locations for at least some of the wireless transmitters.

For the example process 800, a partitioning manager 820 may partition network almanac 810 into a number of regional sub-partitions 830 or a number of sparse network almanac (SNA) 640 sub-partitions. Download manager 850, in an aspect, may determine which information to provide to mobile device 322 by way of a mobile download 860. In an aspect, download manager 850 may select information to provide to mobile device 322 based, at least in part, on information related to an expected route for mobile device 322 identifying one or more geographic regions or sub-regions associated with information stored in network almanac 810.

Mobile device 322 may provide requests for network almanac information through an upload manager 870, in an aspect, and a download request signal 801 may be forwarded to download manager 850. Also, as mentioned previously, mobile device 322 may provide wireless access point information stored in fix database 230 or wireless transmitter database 250 to a network entity, which, for the example depicted in FIG. 8, may comprise upload manager 870. Upload manager 870 may further collect wireless access point information from a number of other mobile devices, and such information may be added to network almanac 810, in an aspect.

Figure 9:
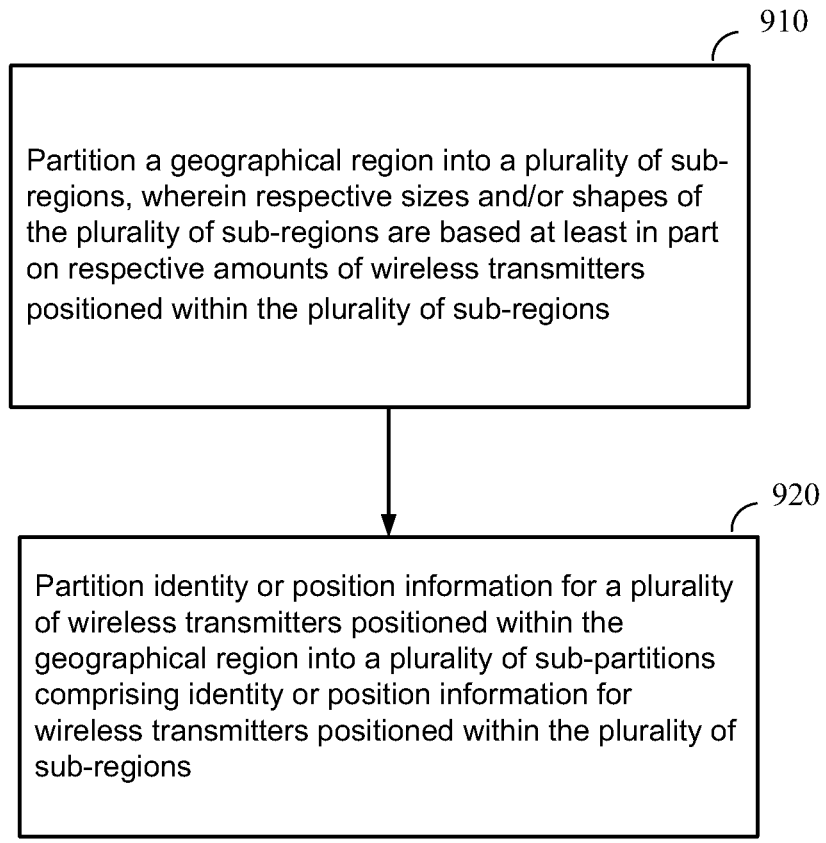
FIG. 9 is a flow diagram of an example process for partitioning identity or position information for a plurality of wireless transmitters.

FIG. 9 is a flow diagram of an example process for partitioning identity or position information for a plurality of wireless transmitters. In an aspect, at block 910, a geographical region may be partitioned into a plurality of sub-regions, wherein respective sizes and/or shapes of the plurality of sub-regions may be based at least in part on respective amounts of wireless transmitters positioned within the plurality of sub-regions. At block 920, identity or position information for a plurality of wireless transmitters positioned within the geographical region may be partitioned into a plurality of sub-partitions comprising identity or position information for wireless transmitters positioned within the plurality of sub-regions. Examples in accordance with claimed subject matter may include less than, all of, or more than blocks 910-920. Further, the order of blocks 910-920 is merely an example order, and claimed subject matter is not limited in these respects.

Additionally, in an aspect, the plurality of sub-partitions may individually comprise a file size not greater than the specified file size threshold. An example process may further include updating the identity or position information for the plurality of wireless transmitters at least in part by modifying the identity or position information for the plurality of wireless transmitters. An example process may also include determining whether any of the plurality of sub-regions have positioned therein an amount of wireless transmitters exceeding a specified threshold at least in part in response to updating the identity or position information for the plurality of wireless transmitters. Additionally, an example process may include partitioning a sub-region of the plurality of sub-regions into a plurality of smaller sub-regions at least in part in response to a determination that the sub-region has positioned therein an amount of wireless transmitters exceeding the specified threshold. The plurality of sub-regions may comprise a circular region specified at least in part by an origin coordinate and a first radius, and the plurality of sub-regions may further comprise one or more regions individually specified at least in part by the first radius, a second radius, a first angle, and a second angle, for example.

An example process may also include partitioning a sub-region into a plurality of smaller sub-regions at least in part by assigning a first angle and a second angle to a plurality of smaller sub-regions, and may further include assigning a first radius to a first of the plurality of smaller sub-regions, assigning the second radius to a second of the plurality of smaller sub-regions. An example process may also include determining one or more intermediate radii for the first and second smaller sub-regions. An example process may further include partitioning identity or position information for the wireless transmitters positioned within the sub-region into a plurality of partitions comprising identity or position information for wireless transmitters positioned within the plurality of smaller sub-regions.

Further, in an example process, a plurality of sub-regions may comprise a substantially rectangular region specified at least in part by one or more corner coordinates. An example process may also include partitioning the substantially rectangular region into a plurality of smaller sub-regions at least in part in response to a determination that the sub-region has positioned therein an amount of wireless transmitters exceeding a specified threshold, wherein partitioning the substantially rectangular region into the plurality of smaller sub-regions may comprise partitioning the substantially rectangular region into a pair of smaller substantially rectangular regions, wherein partitioning the substantially rectangular region into a pair of smaller substantially rectangular regions may include partitioning the substantially rectangular region horizontally at least in part in response to the substantially rectangular region having a height greater than a width, and may further include partitioning the substantially rectangular region vertically at least in part in response to the substantially rectangular region having a width greater than a height.

Figure 10:
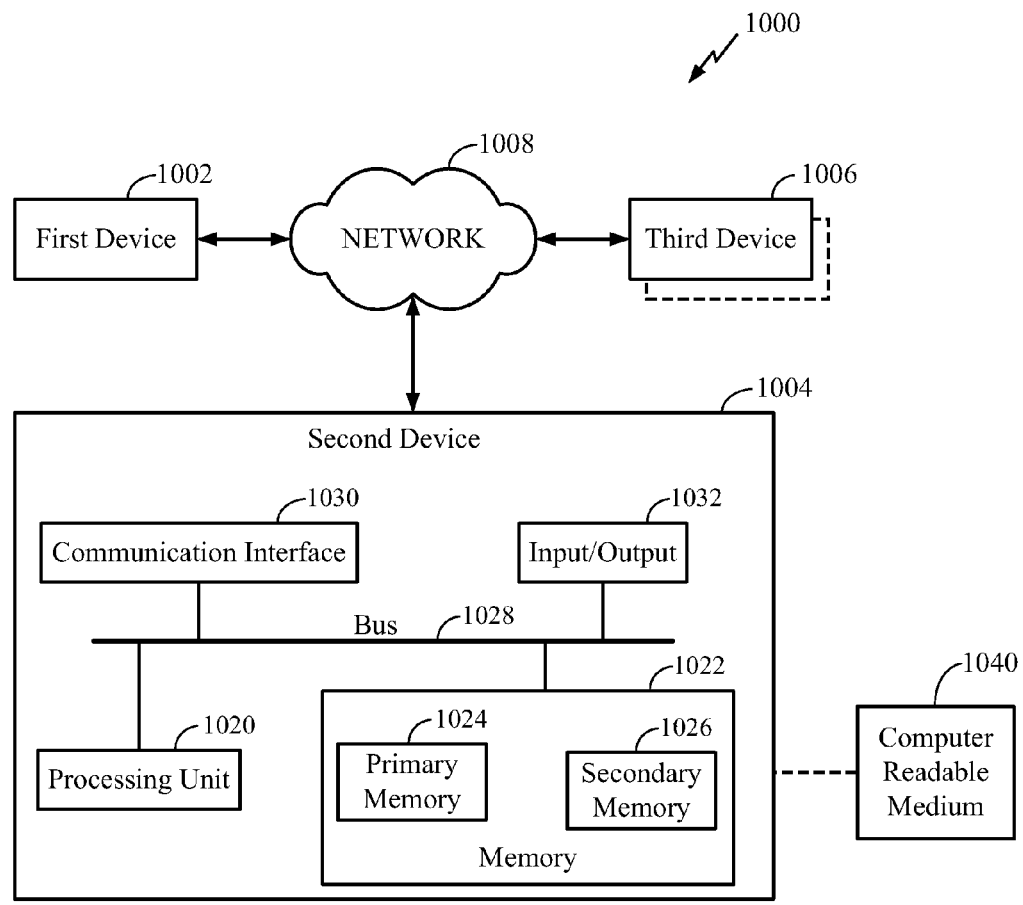
FIG. 10 is a schematic block diagram of an example computing platform.

FIG. 10 is a schematic diagram illustrating an example system 1000 that may include one or more devices configurable to implement techniques or processes described above, for example, in connection with FIGS. 1-9. System 1000 may include, for example, a first device 1002, a second device 1004, and a third device 1006, which may be operatively coupled together through a wireless communications network 1008. In an aspect, first device 1002 may comprise an almanac server or a location server, for example. Second and third devices 1004 and 1006 may comprise mobile devices, in an aspect. Also, in an aspect, wireless communications network 1008 may comprise one or more wireless access points, for example. However, claimed subject matter is not limited in scope in these respects.

First device 1002, second device 1004 and third device 1006, as shown in FIG. 10, may be representative of any device, appliance or machine that may be configurable to exchange data over wireless communications network 1008. By way of example but not limitation, any of first device 1002, second device 1004, or third device 806 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 1002, 1004, and 1006, respectively, may comprise one or more of a base station almanac server, a base station, or a mobile device in accordance with the examples described herein.

Similarly, wireless communications network 1008, as shown in FIG. 10, is representative of one or more communication links, processes, or resources configurable to support the exchange of data between at least two of first device 1002, second device 1004, and third device 1006. By way of example but not limitation, wireless communications network 1008 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 1006, there may be additional like devices operatively coupled to wireless communications network 1008.

It is recognized that all or part of the various devices and networks shown in system 1000, and the processes and methods as further described herein, may be implemented using or otherwise including hardware, firmware, software, or any combination thereof.

Thus, by way of example but not limitation, second device 1004 may include at least one processing unit 1020 that is operatively coupled to a memory 1022 through a bus 1028.

Processing unit 1020 is representative of one or more circuits configurable to perform at least a portion of a data computing procedure or process. By way of example but not limitation, processing unit 1020 may include one or more processors, controllers, microprocessors, microcontrollers, application specific integrated circuits, digital signal processors, programmable logic devices, field programmable gate arrays, and the like, or any combination thereof.

Memory 1022 is representative of any data storage mechanism. Memory 1022 may include, for example, a primary memory 1024 or a secondary memory 1026. Primary memory 1024 may include, for example, a random access memory, read only memory, etc. While illustrated in this example as being separate from processing unit 1020, it should be understood that all or part of primary memory 1024 may be provided within or otherwise co-located/coupled with processing unit 1020.

Secondary memory 1026 may include, for example, the same or similar type of memory as primary memory or one or more data storage devices or systems, such as, for example, a disk drive, an optical disc drive, a tape drive, a solid state memory drive, etc. In certain implementations, secondary memory 1026 may be operatively receptive of, or otherwise configurable to couple to, a computer-readable medium 1040. Computer-readable medium 1040 may include, for example, any non-transitory medium that can carry or make accessible data, code or instructions for one or more of the devices in system 1000. Computer-readable medium 1040 may also be referred to as a storage medium.

Second device 1004 may include, for example, a communication interface 1030 that provides for or otherwise supports the operative coupling of second device 1004 to at least wireless communications network 1008. By way of example but not limitation, communication interface 1030 may include a network interface device or card, a modem, a router, a switch, a transceiver, and the like.

Second device 1004 may include, for example, an input/output device 1032. Input/output device 1032 is representative of one or more devices or features that may be configurable to accept or otherwise introduce human or machine inputs, or one or more devices or features that may be configurable to deliver or otherwise provide for human or machine outputs. By way of example but not limitation, input/output device 1032 may include an operatively configured display, speaker, keyboard, mouse, trackball, touch screen, data port, etc.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, or combinations thereof.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions or information. Such storage devices may comprise any one of several media types including, for example, magnetic, optical or semiconductor storage media. Such storage devices may also comprise any type of long term, short term, volatile or non-volatile memory devices. However, these are merely examples of a storage medium, and claimed subject matter is not limited in these respects.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, or any combination of the above networks, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. 4G Long Term Evolution (LTE) communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access (CDMA) cellular communication protocol, for example, and the femtocell may provide the mobile device access to a larger cellular telecommunication network by way of another broadband network such as the Internet.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

The invention claimed is:

1. A method, comprising:
   partitioning a geographical region into a plurality of sub-regions, wherein respective sizes and/or shapes of the plurality of sub-regions are based at least in part on respective quantities of wireless transmitters positioned within the plurality of sub-regions;
   partitioning identity or position information for a plurality of wireless transmitters positioned within the geographical region into a plurality of sub-partitions comprising identity and/or position information for wireless transmitters positioned within the plurality of sub-regions; and
   partitioning a sub-region of the plurality of sub-regions into a plurality of smaller sub-regions at least in part in response to a determination that the sub-region has positioned therein a quantity of wireless transmitters exceeding a specified threshold.

2. The method of claim 1, wherein the plurality of sub-partitions individually comprise a file size not greater than a specified file size threshold.

3. The method of claim 1, further comprising updating the identity or position information for the plurality of wireless transmitters at least in part by modifying the identity or position information for the plurality of wireless transmitters.

4. The method of claim 3, further comprising determining whether any of the plurality of sub-regions have positioned therein a quantity of wireless transmitters exceeding the specified threshold at least in part in response to the updating the identity or position information for the plurality of wireless transmitters.

5. The method of claim 1, wherein the plurality of sub-regions comprises a circular region specified at least in part by an origin coordinate and a first radius.

6. The method of claim 5, wherein the plurality of sub-regions further comprises one or more regions individually specified at least in part by the first radius, a second radius, a first angle, and a second angle.

7. The method of claim 6, wherein said partitioning the sub-region into the plurality of smaller sub-regions comprises assigning the first angle and the second angle to the plurality of smaller sub-regions, and further comprises assigning the first radius to a first of the plurality of smaller sub-regions, assigning the second radius to a second of the plurality of smaller sub-regions, and determining one or more intermediate radii for the first and second smaller sub-regions.

8. The method of claim 7, further comprising partitioning the identity or position information for the wireless transmitters positioned within the sub-region into a plurality of partitions comprising identity or position information for wireless transmitters positioned within the plurality of smaller sub-regions.

9. The method of claim 1, wherein the plurality of sub-regions comprises a substantially rectangular region specified at least in part by one or more corner coordinates.

10. The method of claim 9, further comprising partitioning the substantially rectangular region into a plurality of smaller sub-regions at least in part in response to a determination that the substantially rectangular region has positioned therein a quantity of wireless transmitters exceeding the specified threshold.

11. The method of claim 10, wherein said partitioning the substantially rectangular region into the plurality of smaller sub-regions comprises partitioning the substantially rectangular region into a pair of smaller substantially rectangular regions.

12. The method of claim 11, wherein said partitioning the substantially rectangular region into a pair of smaller substantially rectangular regions comprises partitioning the substantially rectangular region horizontally at least in part in response to the substantially rectangular region having a height greater than a width, and further comprises partitioning the substantially rectangular region vertically at least in part in response to the substantially rectangular region having the width greater than the height.

13. The method of claim 1, further comprising partitioning support map information, building-specific information, and/or heat map information for a plurality of wireless transmitters positioned within the geographical region into a plurality of sub-partitions comprising support map information, building-specific information, and/or heat map information for wireless transmitters positioned within the plurality of sub-regions.

14. An article, comprising: a storage medium having stored thereon one or more instructions executable by a processor of a server computing platform to:
   partition a geographical region into a plurality of sub-regions, wherein respective sizes and/or shapes of the plurality of sub-regions are based at least in part on respective quantities of wireless transmitters positioned within the plurality of sub-regions;
   partition identity or position information for a plurality of wireless transmitters positioned within the geographical region into a plurality of sub-partitions comprising identity or position information for wireless transmitters positioned within the plurality of sub-regions; and
   partition a sub-region of the plurality of sub-regions into a plurality of smaller sub-regions at least in part in response to a determination that the sub-region has positioned therein a quantity of wireless transmitters exceeding a specified threshold.

15. The article of claim 14, wherein the plurality of sub-partitions individually comprise a file size not greater than a specified file size threshold.

16. The article of claim 14, wherein the storage medium has stored thereon further instructions executable by the processor to update the identity or position information for the plurality of wireless transmitters at least in part by modifying the identity or position information for the plurality of wireless transmitters.

17. The article of claim 16, wherein the storage medium has stored thereon further instructions executable by the processor to determine whether any of the plurality of sub-regions have positioned therein a quantity of wireless transmitters exceeding the specified threshold at least in part in response to the updating the identity or position information for the plurality of wireless transmitters.

18. The article of claim 14, wherein the plurality of sub-regions comprises a circular region specified at least in part by an origin coordinate and a first radius.

19. The article of claim 18, wherein the plurality of sub-regions further comprises one or more regions individually specified at least in part by the first radius, a second radius, a first angle, and a second angle.

20. The article of claim 19, wherein the storage medium has stored thereon further instructions executable by the processor to partition the sub-region into the plurality of smaller sub-regions at least in part by assigning the first angle and the second angle to the plurality of smaller sub-regions, and at least in part by assigning the first radius to a first of the plurality of smaller sub-regions, assigning the second radius to a second of the plurality of smaller sub-regions, and determining one or more intermediate radii for the first and second smaller sub-regions.

21. The article of claim 20, wherein the storage medium has stored thereon further instructions executable by the processor to partition the identity or position information for the wireless transmitters positioned within the sub-region into a plurality of partitions comprising identity or position information for wireless transmitters positioned within the plurality of smaller sub-regions.

22. The article of claim 14, wherein the plurality of sub-regions comprises a substantially rectangular region specified at least in part by one or more corner coordinates.

23. The article of claim 22, wherein the storage medium has stored thereon further instructions executable by the processor to partition the substantially rectangular region into a plurality of smaller sub-regions at least in part in response to a determination that the substantially rectangular region has positioned therein a quantity of wireless transmitters exceeding the specified threshold.

24. The article of claim 23, wherein the storage medium has stored thereon further instructions executable by the processor to partition the substantially rectangular region into the plurality of smaller sub-regions at least in part by partitioning the substantially rectangular region into a pair of smaller substantially rectangular regions.

25. The article of claim 24, wherein the storage medium has stored thereon further instructions executable by the processor to partition the substantially rectangular region into a pair of smaller substantially rectangular regions at least in part by partitioning the substantially rectangular region horizontally at least in part in response to the substantially rectangular region having a height greater than a width, and at least in part by partitioning the substantially rectangular region vertically at least in part in response to the substantially rectangular region having the width greater than the height.

26. The article of claim 14, wherein the storage medium has stored thereon further instructions executable by the processor to partition support map information, building-specific information, and/or heat map information for a plurality of wireless transmitters positioned within the geographical region into a plurality of sub-partitions comprising support map information, building-specific information, and/or heat map information for wireless transmitters positioned within the plurality of sub-regions.

27. An apparatus, comprising: a processor to:
   partition a geographical region into a plurality of sub-regions, wherein respective sizes and/or shapes of the plurality of sub-regions are based at least in part on respective quantities of wireless transmitters positioned within the plurality of sub-regions; and
   partition identity or position information for a plurality of wireless transmitters positioned within the geographical region into a plurality of sub-partitions comprising identity or position information for wireless transmitters positioned within the plurality of sub-regions; and
   partition a sub-region of the plurality of sub-regions into a plurality of smaller sub-regions at least in part in response to a determination that the sub-region has positioned therein a quantity of wireless transmitters exceeding the specified threshold.

28. The apparatus of claim 27, wherein the plurality of sub-partitions individually comprise a file size not greater than a specified file size threshold.

29. The apparatus of claim 27, the processor to update the identity or position information for the plurality of wireless transmitters at least in part by modifying the identity or position information for the plurality of wireless transmitters.

30. The apparatus of claim 29, the processor to determine whether any of the plurality of sub-regions have positioned therein a quantity of wireless transmitters exceeding the specified threshold at least in part in response to the updating the identity or position information for the plurality of wireless transmitters.

31. The apparatus of claim 27, wherein the plurality of sub-regions comprises a circular region specified at least in part by an origin coordinate and a first radius.

32. The apparatus of claim 31, wherein the plurality of sub-regions further comprises one or more regions individually specified at least in part by the first radius, a second radius, a first angle, and a second angle.

33. The apparatus of claim 32, the processor to partition the sub-region into the plurality of smaller sub-regions at least in part by assigning the first angle and the second angle to the plurality of smaller sub-regions, and at least in part by assigning the first radius to a first of the plurality of smaller sub-regions, assigning the second radius to a second of the plurality of smaller sub-regions, and determining one or more intermediate radii for the first and second smaller sub-regions.

34. The apparatus of claim 33, the processor to partition the identity or position information for the wireless transmitters positioned within the sub-region into a plurality of partitions comprising identity or position information for wireless transmitters positioned within the plurality of smaller sub-regions.

35. The apparatus of claim 27, wherein the plurality of sub-regions comprises a substantially rectangular region specified at least in part by one or more corner coordinates.

36. The apparatus of claim 35, the processor to partition the substantially rectangular region into a plurality of smaller sub-regions at least in part in response to a determination that the substantially rectangular region has positioned therein a quantity of wireless transmitters exceeding the specified threshold.

37. The apparatus of claim 36, the processor to partition the substantially rectangular region into the plurality of smaller sub-regions at least in part by partitioning the substantially rectangular region into a pair of smaller substantially rectangular regions.

38. The apparatus of claim 37, the processor to partition the substantially rectangular region into a pair of smaller substantially rectangular regions at least in part by partitioning the substantially rectangular region horizontally at least in part in response to the substantially rectangular region having a height greater than a width, and at least in part by partitioning the substantially rectangular region vertically at least in part in response to the substantially rectangular region having the width greater than the height.

39. The apparatus of claim 27, the processor further to partition support map information, building-specific information, and/or heat map information for a plurality of wireless transmitters positioned within the geographical region into a plurality of sub-partitions comprising support map information, building-specific information, and/or heat map information for wireless transmitters positioned within the plurality of sub-regions.

40. An apparatus, comprising:
   means for partitioning a geographical region into a plurality of sub-regions, wherein respective sizes and/or shapes of the plurality of sub-regions are based at least in part on respective quantities of wireless transmitters positioned within the plurality of sub-regions;
   means for partitioning identity or position information for a plurality of wireless transmitters positioned within the geographical region into a plurality of sub-partitions comprising identity and/or position information for wireless transmitters positioned within the plurality of sub-regions; and
   means for partitioning a sub-region of the plurality of sub-regions into a plurality of smaller sub-regions at least in part in response to a determination that the sub-region has positioned therein a quantity of wireless transmitters exceeding the specified threshold.

41. The apparatus of claim 40, wherein the plurality of sub-partitions individually comprise a file size not greater than a specified file size threshold.

42. The apparatus of claim 40, further comprising means for updating the identity or position information for the plurality of wireless transmitters at least in part by modifying the identity or position information for the plurality of wireless transmitters.

43. The apparatus of claim 42, further comprising means for determining whether any of the plurality of sub-regions have positioned therein a quantity of wireless transmitters exceeding the specified threshold at least in part in response to updating the identity or position information for the plurality of wireless transmitters.

44. The apparatus of claim 40, wherein the plurality of sub-regions comprises a circular region specified at least in part by an origin coordinate and a first radius.

45. The apparatus of claim 44, wherein the plurality of sub-regions further comprises one or more regions individually specified at least in part by the first radius, a second radius, a first angle, and a second angle.

46. The apparatus of claim 45, wherein said means for partitioning the sub-region into the plurality of smaller sub-regions comprises means for assigning the first angle and the second angle to the plurality of smaller sub-regions, and further comprises means for assigning the first radius to a first of the plurality of smaller sub-regions, means for assigning the second radius to a second of the plurality of smaller sub-regions, and means for determining one or more intermediate radii for the first and second smaller sub-regions.

47. The apparatus of claim 46, further comprising means for partitioning the identity or position information for the wireless transmitters positioned within the sub-region into a plurality of partitions comprising identity or position information for wireless transmitters positioned within the plurality of smaller sub-regions.

48. The apparatus of claim 40, wherein the plurality of sub-regions comprises a substantially rectangular region specified at least in part by one or more corner coordinates.

49. The apparatus of claim 48, further comprising means for partitioning the substantially rectangular region into a plurality of smaller sub-regions at least in part in response to a determination that the substantially rectangular region has positioned therein a quantity of wireless transmitters exceeding the specified threshold.

50. The apparatus of claim 49, wherein said means for partitioning the substantially rectangular region into the plurality of smaller sub-regions comprises means for partitioning the substantially rectangular region into a pair of smaller substantially rectangular regions.

51. The apparatus of claim 50, wherein said means for partitioning the substantially rectangular region into a pair of smaller substantially rectangular regions comprises means for partitioning the substantially rectangular region horizontally at least in part in response to the substantially rectangular region having a height greater than a width, and further comprises means for partitioning the substantially rectangular region vertically at least in part in response to the substantially rectangular region having the width greater than the height.

52. The apparatus of claim 40, further comprising means for partitioning support map information, building-specific information, and/or heat map information for a plurality of wireless transmitters positioned within the geographical region into a plurality of sub-partitions comprising support map information, building-specific information, and/or heat map information for wireless transmitters positioned within the plurality of sub-regions.

* * * * *